Patented Oct. 28, 1924.

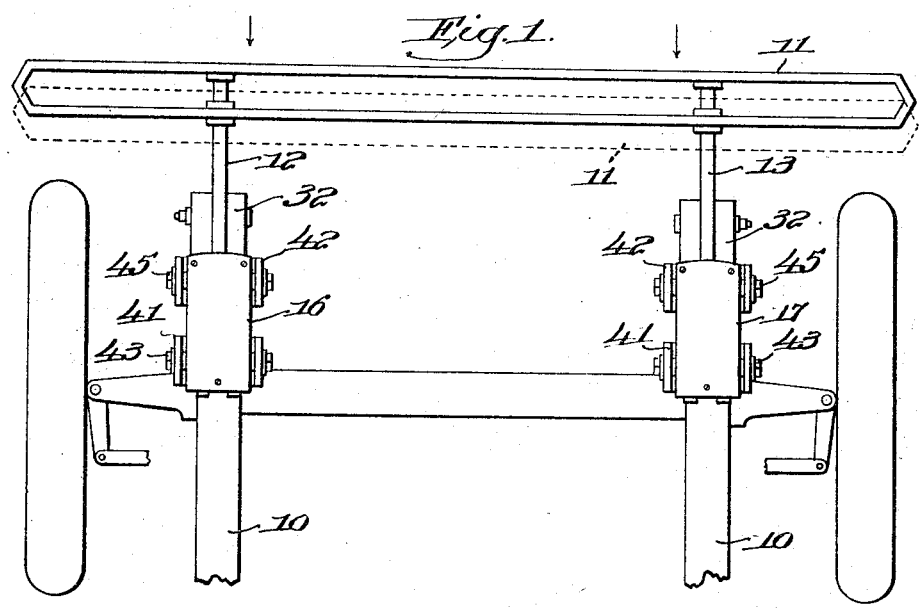
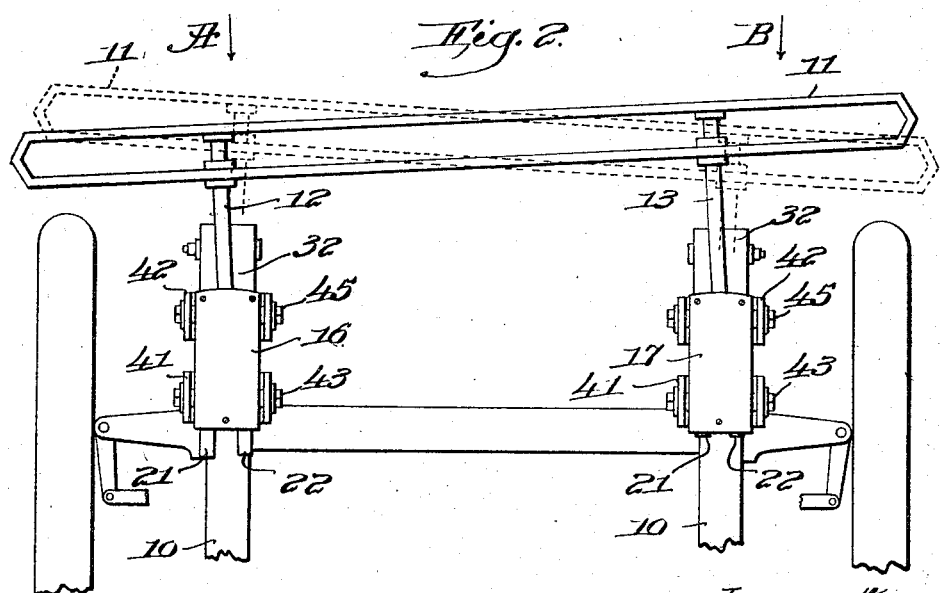

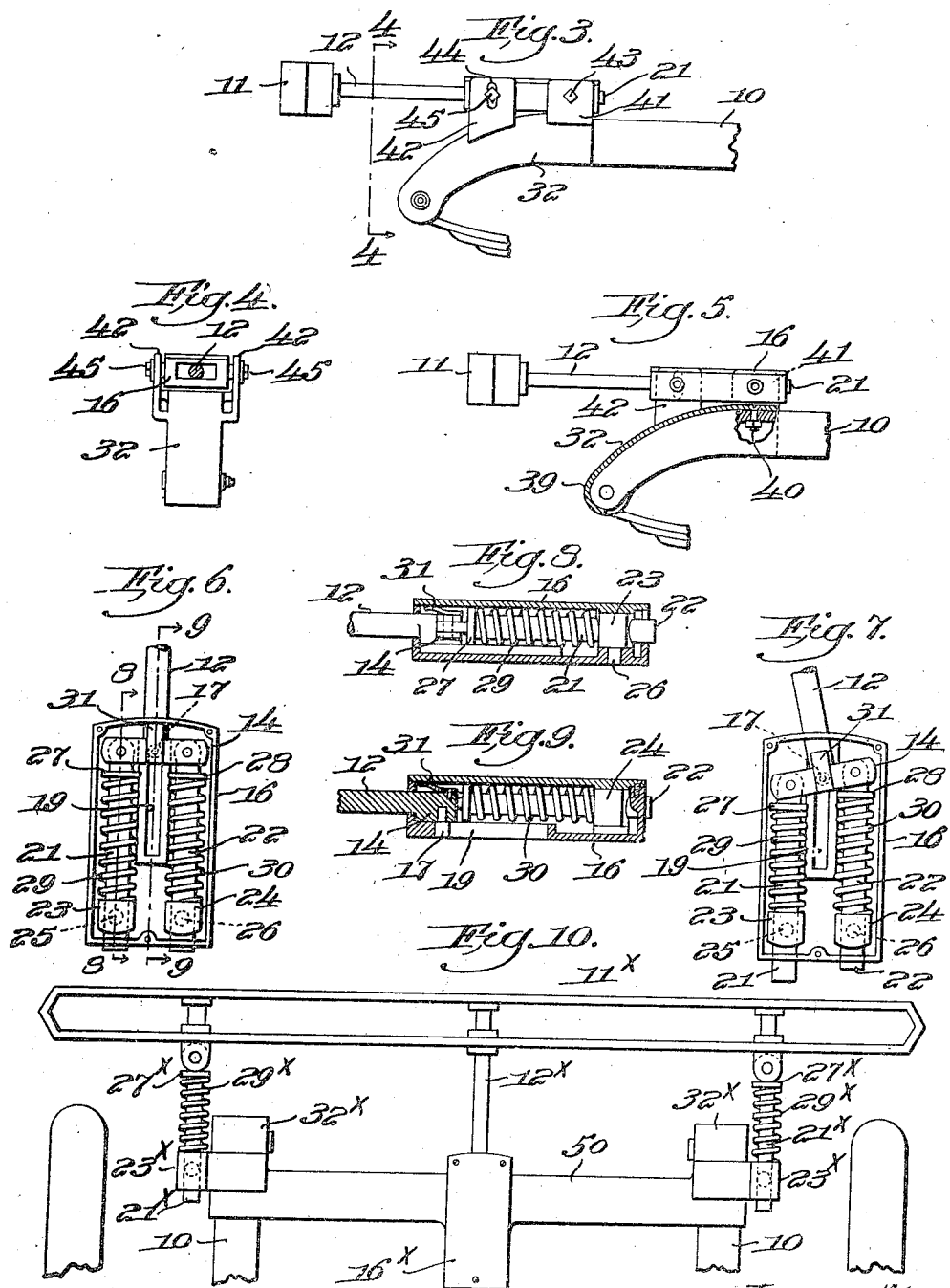

1,512,917

UNITED STATES PATENT OFFICE.

NELLO FINIZIO, OF BOSTON, MASSACHUSETTS.

BUMPER FOR MOTOR-DRIVEN VEHICLES.

Application filed March 26, 1924. Serial No. 702,126.

*To all whom it may concern:*

Be it known that I, NELLO FINIZIO, a subject of the Government of Italy, and a resident of Boston, in the county of Suffolk and Commonwealth of Massachusetts, have invented certain new and useful Improvements in Bumpers for Motor-Driven Vehicles, of which the following is a specification.

This invention relates to bumpers for motor driven vehicles, and more particularly to that class of bumpers that have a comparatively rigid fender or bumper bar that is adapted to be forced rearwardly against the action of strong springs, upon impact with a colliding body.

An object of this invention is to produce a bumper of the above class that is simple in structure and applicable to existing vehicles, and which is of such arrangement that the shock of collision is lessened by the resistance of strong springs and transmitted to the ends of the vehicle frame or chassis which receives it longitudinally of its length, thus eliminating, to great extent, the use of bolts, or clamp devices, which heretofore received the brunt of the shock in an unsatisfactory manner.

A further object of the invention is to produce a bumper that is capable of meeting and yieldingly resisting the ordinary shock of collision, whether the shock be received head on, angularly with respect to the bumper, or at any given point of the bumper.

Another object of the invention is to produce a bumper, which, under ordinary conditions of collision, is unbreakable, because of the fact that provision is made to permit lateral movements thereof as well as rearward, and in each instance yielding resistance is afforded which reduces the shock of impact without breaking the bumper or its mounting.

It is a further object of the invention to produce a bumper having the above qualities and also adapted to be adjusted to position relatively to its mounting.

Heretofore in bumpers of this class the fender bar was mounted on rods which were slidable in fixed bearings, the rods and bar being held in a forward position by means of strong springs, and supposedly adapted to yield upon impact with a colliding body.

As the rods were mounted in fixed bearings, it will be readily understood that the movement of this fender bar was limited to a parallel rearward movement upon direct head-on collision.

If, however, the vehicle collided with another, or a body moving angularly thereto, or the impact should occur at one end or the other of the fender bar, it will be readily seen that the rods would not slide in their bearings, but would cramp, and often times bend or even break upon ordinary impact.

It is an object of the present invention to produce a bumper that is capable of performing its intended function under all ordinary conditions of collision, whether directly head on, or when meeting at an angle, or when impact takes place at one end or the other of the fender bar at an angle or head on.

It is not known that a bumper has ever been used, having the above qualities, and therefore it is not the intention to limit the invention to the precise construction and arrangement shown, as changes might be made therein without departing from its spirit and scope.

The invention further consists in certain novel features of construction and arrangement of parts which will be fully understood from a description of the drawings and the claims hereinafter given.

Of the drawings:

Figure 1 represents in plan view a portion of the forward end of a motor vehicle having the invention attached thereto.

Figure 2 is a view similar to Figure 1 but showing the fender bar in one of the many positions it might assume due to collision.

Figure 3 is a side elevation of a portion of the front end of the frame or chassis showing the means to secure the bumper thereto.

Figure 4 is a section on the line 4—4 Figure 3.

Figure 5 is a view similar to Figure 3 but showing the frame and bumper bracket in vertical longitudinal section.

Figure 6 is a top plan view of a housing with the cover removed showing one form of bumper cushioning and compensating means.

Figure 7 is a view similar to Figure 6 but showing the cushioning and compensating in one of the many positions it may assume.

Figure 8 is a section through the housing taken on the line 8—8 Figure 6, the cushioning means being shown in elevation.

Figure 9 is a section on the line 9—9 Figure 6.

Figure 10 shows a modified form of bumper to be described.

Like characters represent like parts throughout the several figures of the drawings.

Referring to the drawings:

The drawings herewith conveniently illustrate one form in which the invention might be made, but it will be understood that even though springs are herein employed as cushioning means, it is intended to claim broadly, means to absorb the shock of impact, in combination with a rearwardly, and laterally and rearwardly movable fender bar.

The frame or chassis 10 is or may be of any usual or suitable shape or type, the one shown being one such as might be used in pleasure vehicles.

The fender bar 11, preferably of stiff construction which is or may be of any desired shape, is firmly secured to the rods 12 and 13 which may be secured to, or forming part of the cross heads 14, one of which is shown, and adapted, to be moved back and forth in the housings 16 and 17 and guided therein by means of the rollers 17, fast with the cross heads 14 and entering the slots 19.

The said cross heads have rods 21 and 22 pivoted thereto, the free ends of which are slidingly supported in swivel blocks 23 and 24 which have the round studs 25 and 26 depending therefrom, and which enter holes in bosses of the housings 16 and 17.

Collars 27 and 28 fast with said rods have springs 29 and 30 interposed between them and the swivel blocks 23 and 24, the said springs normally retaining the bumper in its forward position as seen in Figure 1.

To prevent rattling, the cross heads are preferably provided with hold down springs, or similar devices, 31 adapted to bear against the cover of the housings 16 and 17.

It is an object of the invention to eliminate clamp devices as holding means for the housings and to reduce the number of bolts required to secure the said housings to the chassis, and to this end a bracket is used which permits certain adjustments to be made to the bumper, and transmits the shock of impact to the chassis in a novel manner.

The bracket 32, in the present instance, is of such shape as to enclose the forward end of the chassis 10 on three sides and having a socket like portion 39 which functions as a hook, to prevent rearward movement of the bracket relatively to the chassis, and which serves to transmit the shock of impact to the chassis.

A bolt 40 serves to retain the bracket in position on the chassis, and since it is not intended to receive heavy shocks, it is only necessary that it be of sufficient size and strength to retain this bracket in position.

Upstanding from the bracket 32 are two sets of cheek plates 41 and 42, the sets 41 being provided with pivot bolts 43 adapted to engage the housings, while the sets 42 have slots 44 therein to receive bolts 45 which engage the said housings and secure them in the desired adjusted position.

A feature of the invention is the adaptability of the bumper to the reception of impact, whether it be head on, angularly received, or at one end or the other angularly, or head on.

The novel manner of mounting the rods 12 and 13 permits of considerable lateral flexibility to the shock receiving bar 11 as will be seen by viewing Figures 1, 2, 6 and 7.

The full line position shown in Figure 1 represents the normal position of the bumper, the dotted line position of bar 11 shows a condition that might exist when head on collision occurs, in which instance the rods 12 and 13 will be forced rearwardly into the housings 16 and 17 in approximately straight coinciding paths, the portions inside the housings maintaining their normal relative positions as seen in Figure 6, excepting that the springs 29 and 30 will have been compressed.

The condition shown in full lines in Figure 2 is one wherein impact has taken place either head on and at the left of the fender bar 11, or angular meeting, as indicated by arrow A, while the dotted line position shows the effect when the impact is at or near the right end of the bar 11, either from direct ahead or angular as indicated by arrow B.

In the first instance as shown in Figure 2 the parts inside the housings will assume approximately the position shown in Figure 7, with both sets of springs 29 and 30 compressed but springs 29 more so than 30.

In the second instance the springs 30 will be more compressed than springs 29 because of the change of position of the cross heads 14.

From the foregoing it will be readily seen that the bumper herein shown is capable of receiving and yielding to ordinary impact, whether it be received head on, angularly, or at or near either end of the bar 11, without breaking or even bending the rods 12 and 13, or the mountings therefor.

Figure 10 shows a modified form of the invention wherein the fender bar 11$^x$ is mounted in a somewhat different manner, the brackets 32$^x$ having a connecting strut or bar 50 upon which is mounted a simple housing 16$^x$ containing structure similar to that of the housing 16 and connected with the bar 11× by a rod 12×.

At each side of the rod 12× and pivotally secured to the bar 11×, are the rods 21× the rear ends of which are slidably mounted in swivel blocks 23× suitably mounted on the brackets 32×.

The said rods have collars 27× between which and the blocks 23× are the springs 29× which are preferably normally under compression.

The arrangement is such that there is no possibility of the rods cramping upon colliding impact, and therefore it is immaterial whether collision occurs head on, angularly, or at either end of the fender bar, the bar will yield rearwardly, and laterally if called upon to do so, under ordinary conditions, without bending or breaking any of the parts.

Having described the invention I claim:

1. A bumper for motor driven vehicles comprising a fender bar; rods extending from said bar; housings into which said rods extend; and means within said housings and coacting with said rods whereby said bar may be forced rearwardly and laterally.

2. A bumper for motor driven vehicles comprising a fender bar adapted to yield upon impact being imposed thereon; rods extending from said bar; housings adapted to be entered by said rods; and compensating means within said housings and coacting with said rods whereby said bar may be made to assume various parallel and angular positions.

3. A bumper for motor driven vehicles comprising a yieldingly mounted fender bar adapted to be forced rearwardly and laterally; rods extending from said bar; housings adapted to receive the ends of said rods; means to guide said rods within said housings; and means coacting with said rods and said housings whereby said bar may yield to impact and assume various parallel and angular positions.

4. A bumper of the class described, comprising a fender bar adapted to be moved rearwardly and laterally upon colliding impact; rods extending from said bar; and means including a plurality of springs whereby said bar may be moved rearwardly and laterally.

5. A bumper of the class described comprising a fender bar adapted to be moved rearwardly and laterally upon colliding impact; rods extending from said bar; cross heads fast with said rods; shiftable guide pivots for said cross heads; means to guide said pivots; and means to normally maintain said bar in impact receiving position.

6. A bumper of the class described, comprising a fender bar adapted to be moved rearwardly and laterally upon colliding impact; rods extending from said bar; cross heads on said rods; guide pivots for said cross heads; guide ways for said pivots; and a plurality of springs coacting with said crossheads whereby said bar may be moved rearwardly and laterally.

7. A bumper of the class described, comprising a fender bar adapted to be moved rearwardly and laterally upon colliding impact; rods extending from said bar; a cross head at the end of each rod; means to guide said cross heads in a manner whereby they may be pivotally swung; rods pivotally connected to said cross heads; guides for said last mentioned rods; means whereby said guides may swivel; and springs coacting with said last mentioned rods whereby said bar is normally held in impact receiving position and may assume various parallel and angular positions.

Signed by me at Boston, Massachusetts, this 22nd day of March 1924.

NELLO FINIZIO.